(12) United States Patent
Le Gac Cesbron et al.

(10) Patent No.: US 12,307,162 B2
(45) Date of Patent: May 20, 2025

(54) SELECTION AND CONTROL OF CONNECTED OBJECTS FROM A SYMBOLIC REPRESENTATION OF A TOPOGRAPHY OF A SITE

(71) Applicant: Orange, Issy-les-Moulineaux (FR)

(72) Inventors: Sylvie Le Gac Cesbron, Chatillon (FR); Thierry Martinez, Chatillon (FR); Sébastien Chevallier, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 18/004,237

(22) PCT Filed: Jul. 2, 2021

(86) PCT No.: PCT/FR2021/051212
§ 371 (c)(1),
(2) Date: Jan. 4, 2023

(87) PCT Pub. No.: WO2022/008822
PCT Pub. Date: Jan. 13, 2022

(65) Prior Publication Data
US 2023/0244440 A1    Aug. 3, 2023

(30) Foreign Application Priority Data

Jul. 5, 2020  (FR) ...................................... 2007117

(51) Int. Cl.
*G06F 3/048* (2013.01)
*G05B 19/042* (2006.01)
(Continued)

(52) U.S. Cl.
CPC ......... *G06F 3/167* (2013.01); *G05B 19/0426* (2013.01); *G06F 3/04817* (2013.01);
(Continued)

(58) Field of Classification Search
None
See application file for complete search history.

(56) References Cited

U.S. PATENT DOCUMENTS

| 10,347,047 B2 * | 7/2019 | Poursohi ............... G06T 19/006 |
| 10,699,803 B1 * | 6/2020 | Do ......................... G16B 45/00 |

(Continued)

OTHER PUBLICATIONS

International Search Report dated Sep. 29, 2021 for corresponding International Application No. PCT/ FR2021/051212, filed Jul. 2, 2021.

(Continued)

*Primary Examiner* — Hua Lu
(74) *Attorney, Agent, or Firm* — David D. Brush; Westman, Champlin & Koehler, P.A.

(57) ABSTRACT

A method for controlling a connected object deployed in a geographical area. A corresponding computer program, storage medium, and processing circuit. The method includes displaying, via a visual interface, a symbolic representation of the geographical area in the form of juxtaposed interactive buttons. Each interactive button is associated with a respective sub-area of the geographical area. The method includes obtaining a sub-area selection command generated by an interaction, via a user interface, with a displayed particular interactive button, selecting the sub-area associated with the particular interactive button, and, on the basis of feedback obtained via the user interface, issuing a control signal intended for the connected object.

14 Claims, 4 Drawing Sheets

(51) Int. Cl.
  *G06F 3/04817* (2022.01)
  *G06F 3/0482* (2013.01)
  *G06F 3/0484* (2022.01)
  *G06F 3/04886* (2022.01)
  *G06F 3/16* (2006.01)
  *G06T 13/80* (2011.01)

(52) U.S. Cl.
  CPC .......... *G06F 3/0482* (2013.01); *G06F 3/0484* (2013.01); *G06F 3/04886* (2013.01); *G06T 13/80* (2013.01); *G05B 2219/23258* (2013.01); *G05B 2219/31474* (2013.01); *G06T 2200/24* (2013.01)

(56) References Cited

U.S. PATENT DOCUMENTS

| | | | | |
|---|---|---|---|---|
| 11,165,954 | B1* | 11/2021 | Beach | H04N 23/65 |
| 2002/0112237 | A1* | 8/2002 | Kelts | G06F 16/954 |
| | | | | 725/135 |
| 2005/0024488 | A1* | 2/2005 | Borg | H04N 21/235 |
| | | | | 348/335 |
| 2008/0034317 | A1* | 2/2008 | Fard | G06T 13/80 |
| | | | | 715/781 |
| 2009/0307255 | A1* | 12/2009 | Park | G06F 16/25 |
| | | | | 707/999.102 |
| 2011/0078624 | A1* | 3/2011 | Missig | G06F 3/0488 |
| | | | | 345/173 |
| 2012/0004739 | A1* | 1/2012 | Sato | H04L 12/282 |
| | | | | 700/7 |
| 2012/0221986 | A1* | 8/2012 | Whitford | G06F 30/13 |
| | | | | 716/100 |
| 2015/0261412 | A1* | 9/2015 | Guillama | G06F 3/0482 |
| | | | | 715/835 |
| 2015/0261427 | A1* | 9/2015 | Sasaki | H04L 41/22 |
| | | | | 715/736 |
| 2016/0163186 | A1* | 6/2016 | Davidson | G06Q 50/06 |
| | | | | 340/506 |
| 2017/0047053 | A1* | 2/2017 | Seo | G10H 1/053 |
| 2017/0123653 | A1* | 5/2017 | Harada | G05B 15/02 |
| 2017/0192981 | A1* | 7/2017 | Glover | H04L 67/289 |
| 2018/0351762 | A1* | 12/2018 | Iyengar | H04L 12/2827 |
| 2019/0007812 | A1* | 1/2019 | Shilov | H04W 4/06 |
| 2019/0028886 | A1* | 1/2019 | Deixler | H04L 41/0803 |
| 2019/0103021 | A1* | 4/2019 | Rosen | F21V 23/0478 |
| 2019/0146639 | A1* | 5/2019 | Sarode | H04L 12/2812 |
| | | | | 715/764 |
| 2019/0332437 | A1* | 10/2019 | Van Hoof | H04L 41/12 |
| 2019/0332713 | A1* | 10/2019 | Van Hoof | H04L 67/10 |
| 2019/0335300 | A1* | 10/2019 | Viton | H04W 4/38 |
| 2020/0201495 | A1* | 6/2020 | Coffman | H04N 21/42203 |
| 2021/0073449 | A1* | 3/2021 | Segev | G06F 30/27 |

OTHER PUBLICATIONS

Written Opinion of the International Searching Authority dated Sep. 29, 2021 for corresponding International Application No. PCT/FR2021/051212, filed Jul. 2, 2021.

English translation of the Written Opinion of the International Searching Authority dated Sep. 29, 2021 for corresponding International Application No. PCT/FR2021/051212, filed Jul. 2, 2021.

* cited by examiner

SELECTION AND CONTROL OF CONNECTED OBJECTS FROM A SYMBOLIC REPRESENTATION OF A TOPOGRAPHY OF A SITE

CROSS-REFERENCE TO RELATED APPLICATIONS

This Application is a Section 371 National Stage Application of International Application No. PCT/FR2021/051212, filed Jul. 2, 2021, which is incorporated by reference in its entirety and published as WO 2022/008822 A1 on Jan. 13, 2022, not in English.

TECHNICAL FIELD

This disclosure relates to the field of home automation, and relates more particularly to methods, computer programs, and devices for controlling connected objects.

PRIOR ART

The democratization of connected objects, both in homes and in businesses, requires implementing technical solutions for centralizing their control in order to satisfy different requirements concerning comfort, communication, security, etc.

Interfaces currently exist which enable users to access various connected devices and/or objects installed in a given space (for example in a home).

These interfaces present the connected objects in the form of one or more lists. Each connected object is thus identifiable by a name associated with it. Referencing all the connected objects of a building in the form of a simple list has the disadvantage that a user who has access to several objects of the same type in a building runs the risk of activating the wrong object by mistake.

To overcome this disadvantage, it is then necessary to indicate the location of each object. For example, the name associated with each connected object in the list may include an indication of the room where the connected object in question is located. Such naming cannot easily be automated without modeling the building. Moreover, requiring the user to name the connected objects one by one while observing a common naming convention is not very ergonomic.

Another possibility is to create a different list for each room in a building, each list referencing the connected objects present in the corresponding room. The creation of such lists may be semi-automated, simply asking the user to specify in which room each installed connected object is located.

Even so, interaction errors remain possible.

Indeed, the exact location of a given connected object in a given room cannot be indicated unambiguously. One reason is that the layout of the premises may be complex. Another reason is that a given room may comprise several connected objects of the same type. It is also common that the person installing a connected object is not the sole end user. The composition of one or more lists identifying the connected objects and indicating their location therefore may not be intuitive.

More generally, interfaces referencing the connected objects of a site, for example a building, in the form of one or more lists have the disadvantage of not showing or representing the site space.

Software also exists which provides complex modeling of buildings, intended for architecture and construction professionals or for the general public. These representations are based on a 2D or 3D plan of a building.

However, such a representation is not optimal and in particular cannot be adapted to the needs of a control interface for connected objects. Indeed, such a representation would generate high computation and display costs.

There is therefore a need to provide a spatial representation that is not computer resource-intensive to enable a user to control the connected objects installed in a site while avoiding interaction errors due to incorrect identification of the connected objects.

SUMMARY

This disclosure improves the situation.

A method is proposed for controlling at least one connected object which is part of a group of connected objects deployed in a geographical area and connected through a telecommunications network, the method comprising:
  displaying, via a visual interface, a symbolic representation of the geographical area in the form of a plurality of juxtaposed interactive buttons, each interactive button being associated with a respective sub-area of the geographical area, each sub-area being able to be associated with at least one respective connected object of the group of connected objects,
  obtaining a sub-area selection command generated by an interaction, via a user interface, with a particular displayed interactive button,
  on the basis of the sub-area selection command obtained, selecting the sub-area associated with the particular interactive button,
  displaying (21), via a visual interface, a symbolic representation of the selected sub-area in the form of a plurality of juxtaposed interactive buttons, each interactive button being associated with a connected object associated with the sub-area, and
  on the basis of feedback obtained via the user interface, issuing a control signal intended for at least one connected object associated with the selected sub-area.

The telecommunications network may be a local area network, for example for connected objects installed in a home, or a wide-area network, for example for connected objects installed in multiple buildings or even multiple sites.

The control signal sent may be intended to control the connected object, for example turning it on, turning it off, setting a parameter, programming a subsequent operation, etc. The control signal sent may be intended to request information, i.e. the transmission by the connected object of data stored therein or of data that it is capable of measuring by means of a sensor.

By means of the symbolic representation, each connected object is associated with an identified graphic element. The identified graphic element is an interactive reproducible element. Interaction with this identified graphic element allows access to the connected devices or objects associated with the graphic element. In this manner, it is possible to provide a user with a representation of the space that is not computer resource-intensive. This representation of the space allows the user to control any connected object installed in a site while avoiding interaction errors due to incorrect identification of the installed connected objects.

Another advantage, related to the symbolic representation of sensitive geographical areas, is to provide a sufficient level of detail for the control of connected objects by an authorized person, but still sufficiently imprecise to prevent the symbolic representation from being used for malicious purposes.

The features discussed in the following paragraphs may optionally be implemented. They may be implemented independently of each other or in combination with each other:

In one example, the user interface comprises a touch interface module. The user can thus simply press the interactive button corresponding to a sub-area in order to access the list of connected objects installed in the sub-area.

In one example, the user interface comprises a voice interface module. The user can thus simply indicate the name of a sub-area, such as a room or a floor, in order to access the list of connected objects installed in the sub-area.

In one example, the interactive buttons are arranged according to a topological model of the geographical area. The symbolic representation of the geographical area thus helps the user to identify the respective position of each connected object.

In one example, each interactive button has the shape of a honeycomb cell. This regular hexagonal shape allows positioning, against the sides of a first interactive button representing a first sub-area, up to six other buttons of the same size and shape. Such a shape allows the symbolic representation to be particularly encompassing and adaptable to many building topologies. Indeed, such a shape makes it possible to arrange interactive buttons representing rooms of a building so that they faithfully represent the layout of the rooms of the building while using little space on a screen.

In one example, each interactive button comprises an icon and/or text identifying the associated sub-area. Each sub-area is thus easily identifiable.

In one example, the method comprises a determination of the topological model from a series of interactions via the user interface. The user may for example select an icon and/or a text label, assign this icon and/or this text label to a button, and assign the button to a location in the symbolic representation by means of touch actions such as pressing or dragging.

In one example, the method comprises obtaining the relative positions of the connected objects of the group of connected objects, for example on the basis of channel state information, and determining the topological model on the basis of the relative positions obtained. It is thus possible that the connected objects automatically acquire their relative position to each other, so that a moved or newly installed connected object is automatically associated with the same geographical sub-area as the closest connected object.

In one example, the method comprises receiving a notification relating to a given connected object associated with a given sub-area, and visually animating the interactive button associated with the given sub-area in order to alert a user that the notification has been received. It is thus possible to notify a user automatically of a particular event detected by a connected object situated in a sub-area where the user is not necessarily located.

In one example, the visual animation comprises highlighting or a change of color. The animation is then a variation in the appearance, such that the user recognizes the sub-area associated with the button while identifying that information relating to the sub-area is available.

In one example, the method comprises, in response to the selection of the sub-area:
  displaying, by the visual interface, a symbolic representation of the sub-area in the form of a plurality of juxtaposed interactive buttons of lower hierarchical level, each interactive button of lower hierarchical level being associated with a respective subdivision of the selected sub-area, each subdivision being associated with at least one respective connected object,
  obtaining a subdivision selection command generated by an interaction, via the user interface, with a particular displayed interactive button of lower hierarchical level,
  on the basis of the subdivision selection command obtained, selecting the subdivision associated with the particular interactive button of lower hierarchical level, and
  wherein the control signal, issued on the basis of feedback obtained via the user interface, is intended for at least one connected object associated with the selected subdivision.

It is thus possible, in order to avoid overloading the symbolic representation of the geographical area, to subdivide it into different levels of detail. For example, a main symbolic representation may represent different buildings, while a more precise symbolic representation may be limited to a particular building, while indicating subdivisions such as floors, rooms, sections, or others.

In particular, any geographical area may be represented simply and modularly by means of a series of honeycomb cell-shaped symbolic representations having different levels of detail.

In one example, the symbolic representation of the sub-area comprises an interactive menu button associated with the geographical area, and the method comprises, upon receiving an interaction with the interactive menu button via the user interface, cancelling the sub-area selection command.

The user can thus navigate freely, not only from a main symbolic representation to a more precise symbolic representation, but also in reverse.

Also proposed is a computer program comprising instructions for implementing the above method when this program is executed by a processor.

Also proposed is a non-transitory computer-readable storage medium on which is stored a program for implementing the above method when this program is executed by a processor.

Also proposed is a processing circuit comprising a processor connected to a communication interface and to the above non-transitory storage medium.

BRIEF DESCRIPTION OF DRAWINGS

Other features, details, and advantages will become apparent upon reading the detailed description below, and upon analyzing the appended drawings, in which.

DESCRIPTION OF EMBODIMENTS

Figure 1:
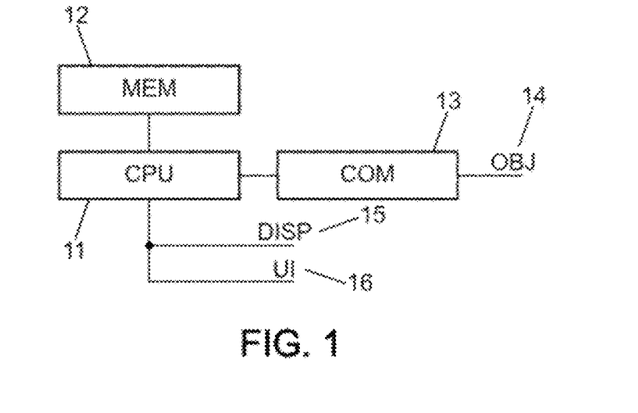
FIG. 1 schematically represents a processing circuit for implementing a control method in one embodiment.

Reference is made to [FIG. 1] which shows a processing circuit of an electronic device such as a tablet, a mobile phone, a computer, a television, a TV decoder, a game console, a home gateway, a machine on which a decentralized digital service is based, etc.

The electronic device comprises, or is connected to, a user interface UI (16) that allows a user to control the device. User interface UI (16) may comprise for example a keyboard, a mouse, a touch screen, a microphone coupled to software for interpreting voice commands, a joystick, etc. In addition, the electronic device comprises, or is connected to, a visual display device DISP (15) such as a screen or a projector.

The processing circuit comprises a processor CPU (11) connected to a data storage device MEM (12) and to a communication interface COM (13). The electronic device is networked, via communication interface COM (13), to a plurality of connected objects or devices OBJ (14). The processor is further capable of processing commands received from user interface UI (16) and of controlling visual display device DISP (15).

Connected objects or devices OBJ (14) are distributed into different geographical sub-areas of a given geographical area and are connected, via a wired communication network or by radio waves, with the electronic device.

The given geographical area may designate a building, a floor, a set of rooms. For example, the given geographical area may be a home and the connected objects or devices, located in different rooms, may be connected to a home communication network referred to as a home automation network.

Alternatively, for example for a corporate or university network, the given geographical area may designate a single building or a set of buildings spread over one or more sites.

Figure 2:
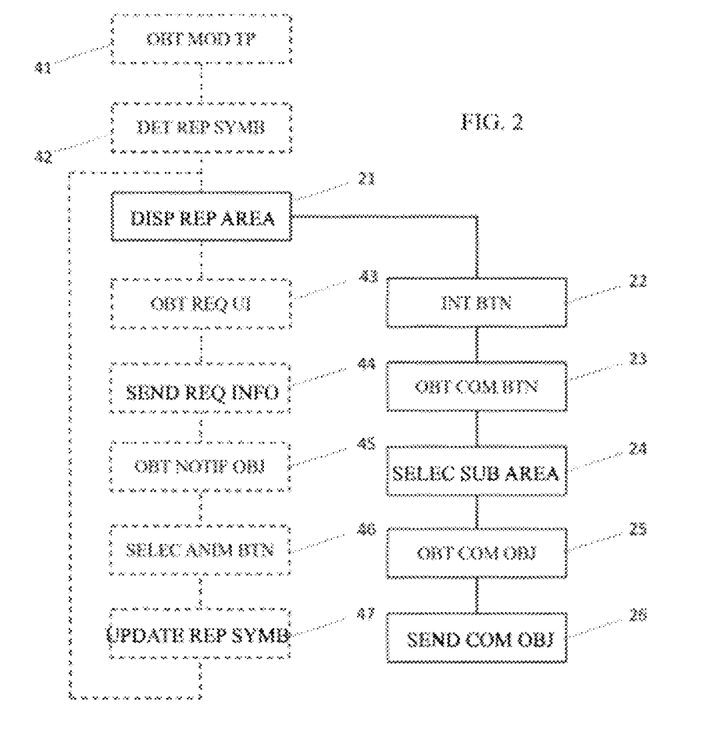
FIG. 2 schematically represents a control method in one embodiment.

Reference is now made to [FIG. 2], which shows, in one exemplary embodiment, a flowchart of a general algorithm of a computer program that may be loaded onto data storage device MEM (12) and executed by processor CPU (11).

Processor CPU (11) obtains OBT MOD TP (41) a topological model of the given geographical area. The topological model may be obtained automatically, for example on the basis of estimates of the relative positions of the connected objects or devices.

Alternatively, the topological model may be obtained on the basis of interactions with a user who indicates the location of each connected object or device in the given geographical area. Alternatively, the topological model may be predetermined, for example by dedicated software such as architecture software.

Processor CPU (11) then determines DET REP SYMB (42), on the basis of the topological model obtained, a symbolic representation of the given geographical area.

Figure 3:
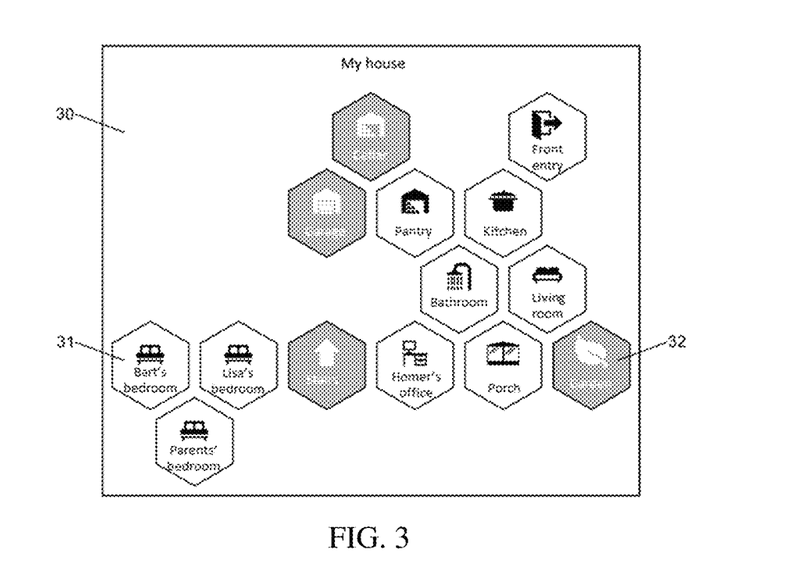
FIG. 3 shows an example of a symbolic representation that may be displayed by a visual interface within the context of implementing the control method of [FIG. 2].

FIG. 3 shows an example of such a symbolic representation (30) which comprises a set of juxtaposed locations. Each location may be occupied by a button or may be unoccupied.

A plurality of locations are occupied by interactive buttons (31) appearing on a white background in [FIG. 3]. Optionally, one or more locations may be occupied by non-interactive buttons (32) appearing on a gray background in [FIG. 3].

It is thus possible, for example, to display an interactive button (31) for each geographical sub-area in which at least one connected object is installed and a non-interactive button (32) for each geographical sub-area in which no connected object is installed.

The locations (31, 32) may for example be round, triangular, square, rectangular, hexagonal (honeycomb cell-shaped), etc.

In one exemplary embodiment, the locations all have the same shape and size. The locations can thus be arranged in a regular distribution, i.e. the spacing between the centers of two neighboring interactive locations has a uniform value.

Buttons (31, 32) are each associated with a geographic sub-area and may comprise a text box and/or an icon to allow identification of the geographic sub-area by a user. For example, if the geographical area is a home composed of several rooms, then each button can correspond to a different room.

A mapping table between the locations, the buttons occupying the locations, and the sub-areas associated with the buttons, may be stored in data storage device MEM (12) and be made read-accessible to processor CPU (11) in order to construct the symbolic representation of the given geographical area. The mapping table may also be made write-accessible to processor CPU (11) in order to update the symbolic representation of the given geographical area.

The arrangement of buttons (31, 32) may be determined so as to represent the topology of the geographical area. It is thus possible, for example, to arrange side by side the buttons corresponding to contiguous rooms. Alternatively, it is possible to arrange the buttons side by side according to a criterion other than topological, for example according to an alphabetical order or by thematic grouping.

The symbolic representation of the given geographical area is not necessarily determined by the processing circuit but may be predetermined by any digital service or device and simply obtained, for example downloaded, by the processing circuit.

CPU (11) controls the visual display device so as to display DISP REP AREA (21) the symbolic representation of the geographical area.

Provision may be made to update the display at the request of a user or upon receiving a notification generated by one or more connected objects. Thus, at any time, the processing circuit may optionally obtain OBT REQ UI (43), via the user interface UI (16), a request to obtain information relating to one or more connected objects OBJ (14). For example, the user may have contactor switches at the windows in his/her home and wishes to know which windows are open at the current time. For example, the user may have connected lights and wishes to know whether the lamps located in the upstairs rooms are off.

Processor CPU (11) can process the request in order to determine, among connected objects OBJ (14), one or more connected objects capable of providing the required information. The processing circuit can then send SEND REQ INFO (44) an information request signal to the connected object(s) concerned. In response, a notification sent by the or each connected object concerned, is obtained OBT NOTIF OBJ (45) by the processing circuit. Returning to the example of the user wishing to know which windows are open, each contactor can send back to the processing circuit a respective signal indicating that the corresponding window is open or closed.

Furthermore, it is possible to predefine standard situations for which a given connected object can automatically send a notification to the processing circuit without requiring the prior sending of an information request signal by the processing circuit. Examples of such typical situations may be notification of an update installation, detection of an anomaly, intrusion, hazard, etc.

Provision may be made to animate an interactive button corresponding to a geographical sub-area on the basis of notifications received from connected objects installed in this geographical sub-area. Animating an interactive button is understood to mean applying a particular static or dynamic animation to it, such as a change of color, highlighting, blinking, etc., to give the interactive button an appearance that is different from its standard appearance.

For example, several interactive button animations may be predefined and accessible to processor CPU (11) in the form of a database stored in data storage device MEM (12). Each animation may be associated with a particular type of notification received.

It is thus possible, by means of different variations of a standard appearance of an interactive button, to be able to select SELEC ANIM BTN (46) a relevant animation or a combination of relevant animations for each interactive button, and to update UPDATE REP SYMB (47) the symbolic representation of the area in order to take into account the selected animation(s).

It is thus possible to indicate to a user different types of useful information relating to the sub-areas, simultaneously or not.

Due to the possibility of animating the interactive buttons, a user can for example instantly see, by means of the display device, which sub-areas contain at least one connected object that is in operation.

Figure 4:
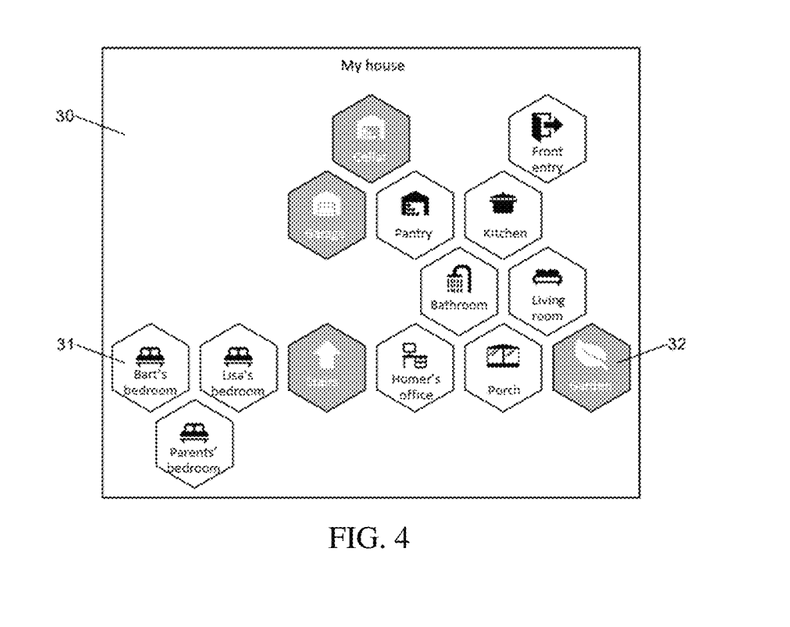
FIG. 4 shows an example of an interactive display by a dynamically animated visual interface within the context of implementing the control method of [FIG. 2].

Reference is now made to [FIG. 4] which illustrates an example of a symbolic representation (30) displayed by a display device. Several interactive buttons (31) are displayed as well as several non-interactive buttons (32). Each button is associated with a corresponding sub-area, here a room in a house. Each button (31, 32) comprises a text box indicating the name of a room in the house as well as a default icon indicating the function of the room. The sub-areas in which at least one connected object is installed are represented by an interactive button, giving tangible form to the possibility of interaction with the connected object(s) installed in the corresponding sub-area. The sub-areas in which no connected object is installed are represented by a non-interactive button, here grayed out to indicate that no interaction is possible. A request for information (51) is received by a voice user interface, interpreted, and displayed in text form alongside the symbolic representation (30). In this example, a user wishes to know which windows in the house are open. A response (52) to the information request is also displayed on a following line, still in text form. In this example, in two rooms, at least one window is open. The interactive buttons corresponding to these rooms here are interactive buttons (53) animated by means of highlighting combined with a replacement of the default icon by an informative icon here indicating an open window. The user thus immediately sees in the symbolic representation (30) which rooms to go to in order to close the windows that remain open.

Figure 5:
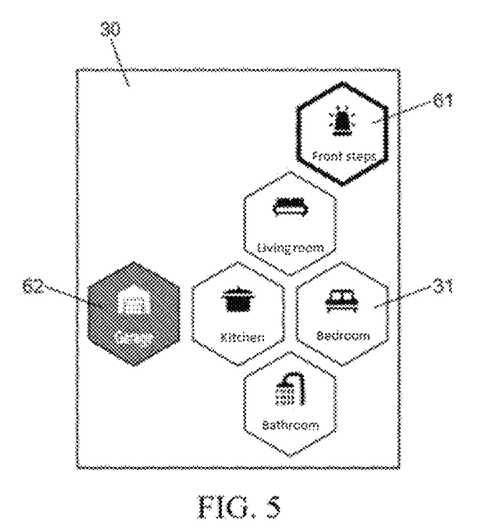
FIG. 5 shows another example of an interactive display by a dynamically animated visual interface within the context of implementing the control method of [FIG. 2].

Reference is now made to [FIG. 5] which illustrates another example of a symbolic representation (30) displayed by a display device. Several interactive buttons (31), respectively associated with a corresponding sub-area of a home, are juxtaposed according to the topology of the home. As in [FIG. 4], each interactive button (31) comprises a text box indicating the name of a room in the house as well as a default icon indicating the function of the room. In this example, the presence of the user is known via a connected object such as a presence detector installed in a particular room, in this case the garage. In addition, another connected object installed on the porch, such as a surveillance camera, has simultaneously detected unusual movement. To report notifications from connected objects, the interactive buttons corresponding to these sub-areas here are interactive buttons (61, 62) animated in two different ways.

A first interactive button (61) associated with the porch sub-area is animated here by highlighting, i.e. the appearance of a line, possibly colored, along the outline of the button, combined here with a change of icon. It is possible to store, on the data storage device, each event reported to the user. Based on the history of events reported to the user, it is possible to determine that the user has never previously encountered a certain type of event, and in this case to report this type of event through a button animation according to a specific signaling system.

A second interactive button (62) associated with the garage sub-area is animated here by a general change of color of all elements of the button (text, icon and background). Such a signaling system may be known to the user beforehand, indicating his or her own presence as is commonly detected.

The user thus understands, in view of symbolic representation (30), that two different types of events are being detected simultaneously.

In a context where temperature sensors are arranged in each sub-area, the interactive buttons associated with the different sub-areas may for example take on different colors depending on the temperature detected in the associated sub-area. The displayed symbolic representation can thus be interpreted by a user as a symbolic temperature map of the geographical area.

In an industrial context, a user may for example be informed, by means of the display device, of a possible operational or safety anomaly detected in a sub-area and can thus immediately identify the sub-area in question and trigger a targeted intervention.

Figure 6:
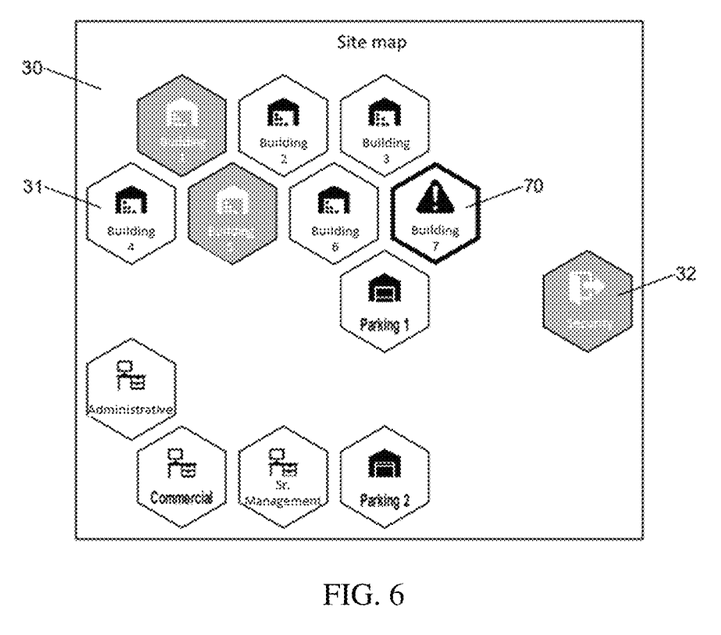
FIG. 6 shows yet another example of an interactive display by a dynamically animated visual interface within the context of implementing the control method of [FIG. 2].

Reference is now made to [FIG. 6] which illustrates another example of a symbolic representation (30) displayed to a user by a display device. Several interactive buttons (31) are represented and correspond to respective subdivisions of a corporate network into geographical sub-areas each corresponding to a respective building where there are connected objects to which control permissions are granted to the user. Several non-interactive buttons (32) are also represented and correspond to buildings for which the user has no access or control permissions for the connected objects located there. In this example, in the symbolic representation, an interactive button (31) is replaced by an animated interactive button (70) which uses highlighting combined with a replacement of the default icon by an informative icon which here indicates a hazard.

The user is thus informed that a connected object installed in the corresponding building has detected an event requiring urgent action. The user can then interact with animated interactive button (70) via user interface UI (16) in order to obtain more details, for example about the nature of the event, about the connected object having detected the event, about the exact location of this connected object in the building, or even about the possibility of controlling this connected object remotely in order to resolve the event.

Reference is once again made to [FIG. 2]. Once the symbolic representation of the geographical area has been displayed, it is possible for a user to interact INT BTN (22) with an interactive button (31), animated or not, of his/her choice. The interaction may be, for example, pressing the interactive button as it appears on a portion of a touch screen. The interaction may be, for example, a voice command comprising the name of the sub-area as it appears for example in the text box of the interactive button. Other types of interaction are possible, depending on the nature of user interface UI (16).

User interface UI (16) obtains, by means of an interaction OBT COM BTN (23), a command for interaction with an interactive button. This command is sent to processor CPU (11) which processes it.

Processor CPU (11) proceeds, on the basis of the interaction command, to select SELEC SUB AREA (24) the geographical sub-area associated with the button with which the user has interacted.

Next, CPU (11) may access a description of the selected sub-area and display this description to the user.

For example, the description of the selected sub-area may be a list of connected objects installed in the selected sub-area. This list can then be displayed by the display device, for example in the form of a drop-down menu, classified by alphabetical order, order of frequency of use, order of preference, or other, and allow selecting an individual connected object or a group of connected objects. Selection of the connected object may be implemented via the user interface, whether touch or voice. If only one connected object is installed in the selected sub-area, then selecting the sub-area can automatically result in selecting the connected object installed in the sub-area.

An interaction with the selected connected object is implemented via the user interface, whether touch or voice. This interaction is: controlling the selected connected object, such as turning this connected object on or off; or adjusting an operating parameter of this connected object; or scheduling a later operation of this connected object.

To help the user make the choice of interaction with the connected object selected, it is possible at this stage to display one or more indications obtained from the connected object and/or a list of possible commands that can be generated by the processing circuit in order to control the connected object.

In other words, the processing circuit obtains OBT COM OBJ (250) a command, generated by an interaction with the user interface and intended for the selected connected object.

In response to obtaining the command from the user interface, the processing circuit issues SEND COM OBJ (26) a control signal and transmits it to the selected connected object in order to control this connected object in accordance with the choice made by the user.

Figure 7:
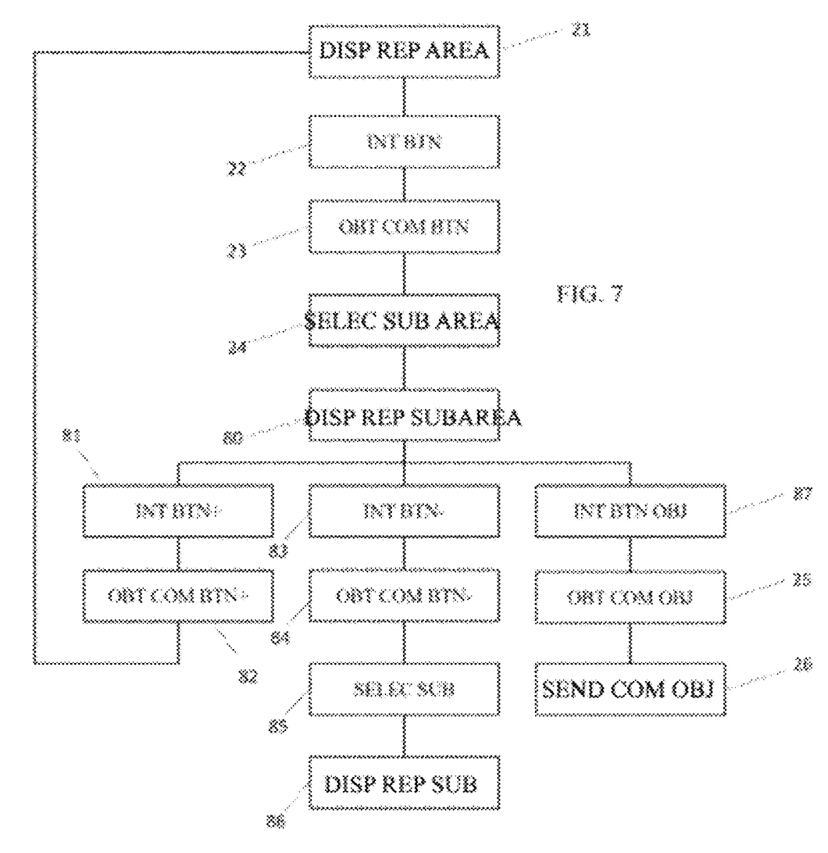
FIG. 7 schematically depicts a control method in an embodiment where the display has a plurality of levels of detail.

Reference is now made to [FIG. 7] which illustrates another example of an embodiment.

In this example, in response to selecting SELEC SUB AREA (24) the sub-area, processor CPU (11) accesses a symbolic, detailed representation of the selected sub-area and orders its display DISP REP SUBAREA (80) to the user by the display device.

Figure 8:
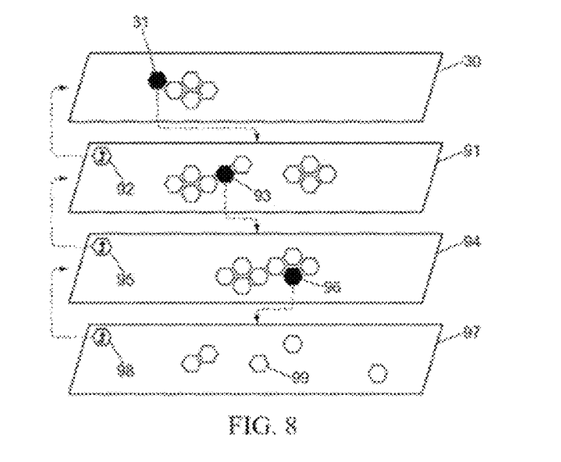
FIG. 8 shows an example of a series of symbolic representations that may be successively displayed by a visual interface within the context of implementing the control method of [FIG. 7].

Reference is now made to [FIG. 8] which illustrates four symbolic representations (30, 91, 94, 97), of respective hierarchical levels 4, 3, 2 and 1.

The symbolic representation of hierarchical level 4 corresponds to a geographical area, for example an industrial site comprising several buildings. Several juxtaposed interactive buttons of hierarchical level 4 (31) are represented, each corresponding to a particular sub-area, for example to a particular building.

When a user interacts with an interactive button of hierarchical level 4 (31), it is possible to switch the display to the symbolic representation of hierarchical level 3 (91) corresponding specifically to the associated sub-area, in order to benefit from a higher level of detail. Several juxtaposed interactive buttons of hierarchical level 3 (93) are represented, each corresponding to a respective subdivision of the selected sub-area, for example a particular floor of the building.

When a user interacts with an interactive button of hierarchical level 3 (93), it is possible to switch the display to the symbolic representation of hierarchical level 2 (94) corresponding specifically to the associated subdivision, in order to benefit from a higher level of detail. Several juxtaposed interactive buttons of hierarchical level 2 (96) are represented here, each corresponding to a respective basic subdivision of the selected subdivision, for example a particular room of the floor.

When a user interacts with an interactive button of hierarchical level 2 (96), it is possible to switch the display to the symbolic representation of hierarchical level 1 (97) corresponding specifically to the associated basic subdivision, in order to benefit from a higher level of detail. Several interactive buttons of hierarchical level 1 (99) are represented here, each corresponding for example to a particular connected object installed in the room. The layout of the interactive buttons of hierarchical level 1 may be based on the respective positions of the connected objects installed in the room, in order to guarantee correct identification of the objects with which to interact.

It is also possible to navigate from a given symbolic representation to another symbolic representation of a higher hierarchical level. Indeed, the symbolic representations of hierarchical levels 1, 2 and 3 (97, 94, 91) each include an interactive menu button (98, 95, 92) which allows switching back to displaying the symbolic representation of higher hierarchical level.

It is thus possible to interact with any connected object present in a complex industrial site, in a simple manner and while avoiding identification errors, due to the navigation between different hierarchical symbolic representations according to their level of detail.

To illustrate navigating from these different symbolic representations, reference is once again made to [FIG. 7]. It is considered here that a user has chosen, by interaction with an interactive button (31) of the symbolic representation (30) of an industrial site, to display a symbolic representation (91) of a particular building of the site. It is therefore considered that at a current instant, symbolic representation (91) of this building is being displayed to the user by a display device.

At the current instant, the user is able to interact INT BTN+ (81) with the displayed interactive menu button (92). In doing so, the processing circuit obtains OBT COM BTN+ (82) a command, coming from the user interface UI (16), relating to the displayed interactive menu button (92). In response to obtaining this command, the processing circuit orders the displaying DISP REP AREA (21) of the symbolic representation of the industrial site. The user can then choose to view the symbolic representation of another building.

At the current instant, the user is also able to interact with any of interactive buttons (93) of displayed symbolic representation (91) of the building.

Certain interactive buttons (93) may be attached to subdivisions of the building, for example floors, rooms, sections, etc.

Other interactive buttons (93) may alternatively be attached directly to connected objects installed in the building and not specifically assigned to a subdivision of the building.

The user is thus able to interact INT BTN OBJ (87) at the current instant with an interactive button (93) directly associated with a particular connected object or a particular group of connected objects. In this case, the processing circuit obtains OBT COM OBJ (25), via the user interface, a command to interact with the corresponding connected object or objects, and issues SEND COM OBJ (26) a control command for this or these corresponding connected objects.

Alternatively, the user is able to interact INT BTN- (83) at the current instant with an interactive button (93) associated with a subdivision of the building. In this case, the processing circuit obtains OBT COM BTN- (84), via the user interface, a command to interact with this interactive button (93). The processing circuit can then select SELEC SUB (85), from a catalog of symbolic representations of the subdivisions of the building, the symbolic representation of the subdivision associated with this interactive button. The processing circuit can then command that the symbolic representation of this subdivision be displayed DISP REP SUB (86).

The invention claimed is:

1. A method for controlling at least one connected object which is part of a group of connected objects deployed in a geographical area and connected through a telecommunications network, the method being implemented by a processing circuit and comprising:
defining a regular distribution of cells having a same size and a same shape, wherein each of the cells defines a respective location of a plurality of juxtaposed locations;
displaying, via a visual interface, a symbolic representation of the geographical area in the form of a first plurality of juxtaposed interactive buttons, each of the first plurality of juxtaposed interactive buttons being positioned in a respective one of the plurality of juxtaposed locations on the regular distribution of the cells and being associated with a respective sub-area of the geographical area, each sub-area being able to be associated with at least one respective connected object of the group of connected objects,
obtaining a sub-area selection command generated by an interaction, via a user interface, with a particular displayed interactive button,
on the basis of the sub-area selection command obtained, selecting the sub-area associated with the particular interactive button,
displaying, via a visual interface, a symbolic representation of the selected sub-area in the form of a second plurality of juxtaposed interactive buttons, each of the second plurality of juxtaposed interactive buttons being positioned in a respective one of the plurality of juxtaposed locations on the regular distribution of the cells and being associated with a connected object associated with the sub-area,
on the basis of feedback obtained via the user interface, issuing a control signal intended for at least one connected object associated with the selected sub-area,
wherein the symbolic representations of both the geographical area and the selected sub-area utilize the same regular distribution of the cells, with each location either being occupied by an interactive button or occupied by a non-interactive button or left unoccupied.

2. The method according to claim 1, wherein the user interface comprises a touch interface module.

3. The method according to claim 1, wherein the user interface comprises a voice interface module.

4. The method according to claim 1, wherein each of the first and second plurality of juxtaposed interactive buttons has a shape of a honeycomb cell.

5. The method according to claim 1, wherein each of the first and second plurality of juxtaposed interactive buttons comprises an icon and/or text identifying the associated sub-area.

6. The method according to claim 1, wherein the first and second plurality of juxtaposed interactive buttons are arranged according to a topological model of the geographical area.

7. The method according to claim 6, comprising determining the topological model from a series of interactions via the user interface.

8. The method according to claim 6, comprising:
obtaining the relative positions of the connected objects of the group of connected objects, on the basis of channel state information, and
determining the topological model on the basis of the relative positions obtained.

9. The method according to claim 1, comprising:
receiving a notification relating to a given connected object associated with a given sub-area, and
visually animating the interactive button associated with the given sub-area in order to alert a user that the notification has been received.

10. The method according to claim 9, wherein the visual animation comprises highlighting or a change of color.

11. The method according to claim 1, comprising, in response to the selection of the sub-area:
displaying, by the visual interface, the symbolic representation of the sub-area in the form of the second plurality of juxtaposed interactive buttons, which have a lower hierarchical level, each interactive button of the lower hierarchical level being associated with a respective subdivision of the selected sub-area, each subdivision being associated with at least one respective connected object,
obtaining a subdivision selection command generated by an interaction, via the user interface, with a particular displayed interactive button of the lower hierarchical level,
on the basis of the subdivision selection command obtained, selecting the subdivision associated with the particular interactive button of the lower hierarchical level, and
wherein the control signal, issued on the basis of feedback obtained via the user interface, is intended for at least one connected object associated with the selected subdivision.

12. The method according to claim 11, wherein the symbolic representation of the sub-area comprises an interactive menu button associated with the geographical area, and wherein the method comprises, upon receiving an interaction with the interactive menu button via the user interface, cancelling the sub-area selection command.

13. A non-transitory computer-readable storage medium on which is stored a program for implementing a method for controlling at least one connected object which is part of a group of connected objects deployed in a geographical area and connected through a telecommunications network, when this program is executed by a processor, wherein the method comprises:
defining a regular distribution of cells having a same size and a same shape, wherein each of the cells defines a respective location of a plurality of juxtaposed locations;
displaying, via a visual interface, a symbolic representation of the geographical area in the form of a first plurality of juxtaposed interactive buttons, each of the first plurality of juxtaposed interactive buttons being positioned in a respective one of the plurality of juxtaposed locations on the regular distribution of the cells and being associated with a respective sub-area of the geographical area, each sub-area being able to be associated with at least one respective connected object of the group of connected objects,
obtaining a sub-area selection command generated by an interaction, via a user interface, with a particular displayed interactive button,
on the basis of the sub-area selection command obtained, selecting the sub-area associated with the particular interactive button,
displaying, via a visual interface, a symbolic representation of the selected sub-area in the form of a second plurality of juxtaposed interactive buttons, each of the second plurality of juxtaposed interactive buttons being positioned in a respective one of the plurality of juxtaposed locations on the regular distribution of the cells and being associated with a connected object associated with the sub-area, and
on the basis of feedback obtained via the user interface, issuing a control signal intended for at least one connected object associated with the selected sub-area,
wherein the symbolic representations of both the geographical area and the selected sub-area utilize the same regular distribution of the cells, with each location either being occupied by an interactive button or occupied by a non-interactive button or left unoccupied.

14. A processing circuit comprising:
a communication interface;
a non-transitory storage medium; and
a processor connected to the communication interface and to the non-transitory storage medium, the non-transitory storage medium comprising instructions stored thereon which when executed by the processor configure the processing circuit to implementing a method for controlling at least one connected object which is part of a group of connected objects deployed in a geographical area and connected through a telecommunications network, when this program is executed by a processor, wherein the method comprises:
defining a regular distribution of cells having a same size and a same shape, wherein each of the cells defines a respective location of a plurality of juxtaposed locations;
displaying, via a visual interface, a symbolic representation of the geographical area in the form of a first plurality of juxtaposed interactive buttons, each of the first plurality of juxtaposed interactive buttons being positioned in a respective one of the plurality of juxtaposed locations on the regular distribution of the cells and being associated with a respective sub-area of the geographical area, each sub-area being able to be associated with at least one respective connected object of the group of connected objects,
obtaining a sub-area selection command generated by an interaction, via a user interface, with a particular displayed interactive button,
on the basis of the sub-area selection command obtained, selecting the sub-area associated with the particular interactive button,
displaying, via a visual interface, a symbolic representation of the selected sub-area in the form of a second plurality of juxtaposed interactive buttons, each of the second plurality of juxtaposed interactive buttons being positioned in a respective one of the plurality of juxtaposed locations on the regular distribution of the cells and being associated with a connected object associated with the sub-area, and
on the basis of feedback obtained via the user interface, issuing a control signal intended for at least one connected object associated with the selected sub-area,
wherein the symbolic representations of both the geographical area and the selected sub-area utilize the same regular distribution of the cells, with each location either being occupied by an interactive button or occupied by a non-interactive button or left unoccupied.

* * * * *